United States Patent
Fontana, Jr. et al.

(10) Patent No.: US 7,652,954 B2
(45) Date of Patent: Jan. 26, 2010

(54) THERMALLY ASSISTED RECORDING HEAD WITH MAGNETIC POLE INTEGRATED INTO OPTICAL APERTURE FOR DUAL GRADIENT RECORDING

(75) Inventors: Robert E. Fontana, Jr., San Jose, CA (US); James Terrence Olson, Santa Cruz, CA (US); Barry Cushing Stipe, San Jose, CA (US); Timothy Carl Strand, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 68 days.

(21) Appl. No.: 12/154,517

(22) Filed: May 22, 2008

(65) Prior Publication Data
US 2009/0290454 A1  Nov. 26, 2009

(51) Int. Cl.
*G11B 11/00* (2006.01)
(52) U.S. Cl. .............. 369/13.13; 369/13.17; 369/13.33; 369/112.27

(58) Field of Classification Search ............ 369/13.13, 369/13.24, 13.32, 13.33, 13.17, 112.27, 112.23, 369/126; 360/317, 59, 25.01, 69
See application file for complete search history.

(56) References Cited

U.S. PATENT DOCUMENTS

| | | | |
|---|---|---|---|
| 6,016,290 A * | 1/2000 | Chen et al. | 369/13.17 |
| 7,310,205 B2 * | 12/2007 | Hsu et al. | 360/317 |
| 7,365,941 B2 * | 4/2008 | Poon et al. | 360/125.01 |

* cited by examiner

*Primary Examiner*—Ali Neyzari
(74) *Attorney, Agent, or Firm*—Lorimer Labs; D'Arcy H. Lorimer

(57) ABSTRACT

A write head structure for perpendicular recording having a pole tip integrated into the metal film surrounding a C aperture near field light source is disclosed. The close proximity of the pole tip to the light source enables more precise location of data cells written into the magnetic media, through the use of dual gradient thermally assisted recording. In dual gradient recording, data is fixed by the effect of both a thermal gradient, which affects the coercivity of the magnetic media, combined with a magnetic field gradient imposed by the pole tip.

20 Claims, 7 Drawing Sheets

Fig. 1a

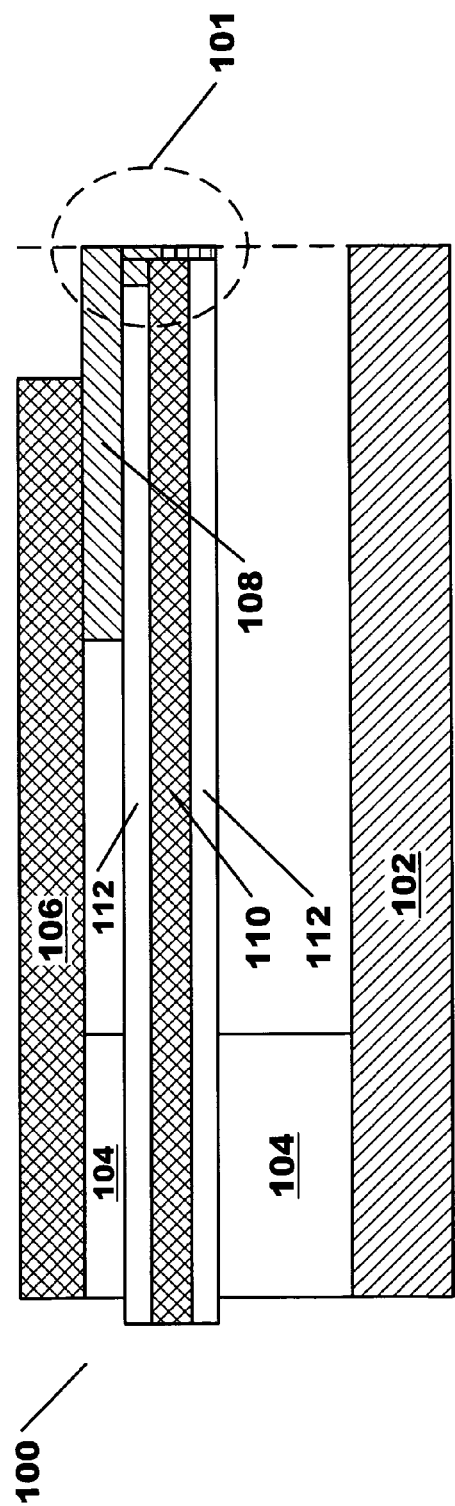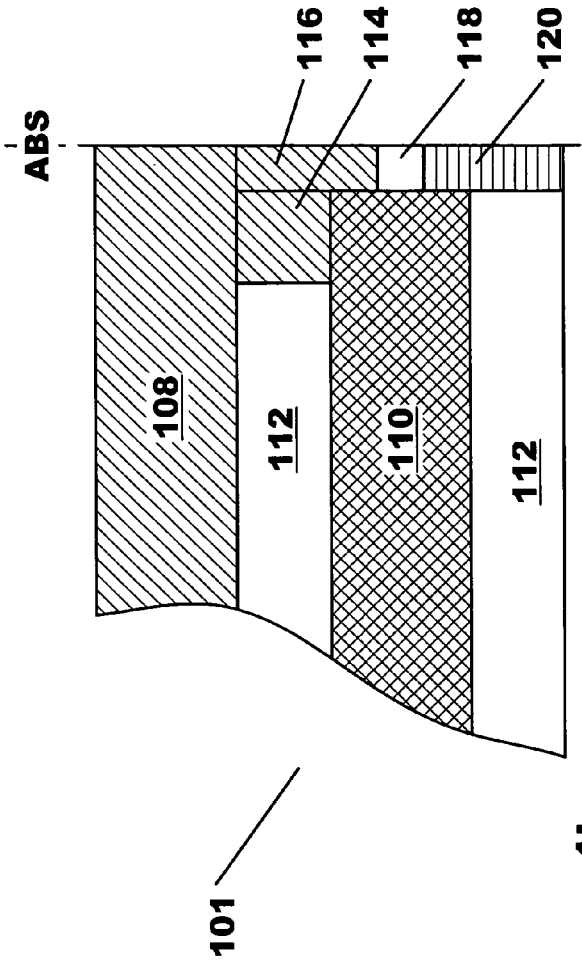
Figure 1a
Figure 1b

THERMALLY ASSISTED RECORDING HEAD WITH MAGNETIC POLE INTEGRATED INTO OPTICAL APERTURE FOR DUAL GRADIENT RECORDING

BACKGROUND OF THE INVENTION

1. Field of the Invention

This invention relates to structures of thin film magnetic write heads. More specifically, the invention relates to structures of a thin film write heads for thermally assisted, dual gradient recording, wherein a portion of the magnetic write pole is integrated into the structure of an optical aperture, the aperture serving as ridge waveguide near field optical source.

2. Description of the Related Art

The ongoing quest for higher storage bit densities in magnetic media used in, for example, hard disk drives, have reduced the size (volume) of data cells to the point where the cell dimensions are limited by the grain size of the magnetic material. Although grain size can be reduced further, there is concern that data stored within the cells is no longer thermally stable, as random thermal fluctuations at ambient temperatures are sufficient to erase data. This state is described as the superparamagnetic limit, which determines the maximum theoretical storage density for a given magnetic media. This limit may be raised by increasing the coercivity of the magnetic media or lowering the temperature. Lowering the temperature is not a practical option when designing hard disk drives for commercial and consumer use. Raising the coercivity is a practical solution, but requires write heads employing higher magnetic moment materials, or techniques such as perpendicular recording (or both).

One additional solution has been proposed, which employs heat to lower the effective coercivity of a localized region on the magnetic media surface; writes data within this heated region with a broad magnetic field; and, "fixes" the data state by cooling the media to ambient temperatures. This technique is broadly referred to as "thermally assisted (magnetic) recording", TAR or TAMR. It can be applied to both longitudinal or perpendicular recording systems, although the highest density state of the art storage systems are more likely to be perpendicular recording systems. Heating of the media surface is accomplished by a number of techniques such as focused laser beams or near field optical sources.

FIG. 6 (Prior Art) is a chart 600 of field strength H as a function of position on the media for conventional thermally assisted recording. An optical source is projected onto the media surface, creating a heated zone 608. Within this zone, the coercivity $H_k$ of the media changes in accordance with curve 602, wherein the lowest coercivity occurs at the hottest point within the heated zone 608. Surrounding the heated zone is an applied magnetic field of strength $H_{eff}$ curve 604. Although the broad field $H_{eff}$ determines the value of the data bit being written, the data is not "fixed" on the media until the media temperature falls below a particular value, where $H_k$ equals $H_{eff}$, the recording point 606. For state of the art high density recording applications, the position of this recording point must be known as accurately as possible. This may be partially accomplished by reducing the size of the heated zone as much as possible, but variations in the magnetic and thermal properties of each magnetic grain (or cluster) can still result in variations between the intended magnetic transition position and the actual position. This position "jitter" can subsequently produce data errors.

What is needed is an improved method for thermally assisted recording.

SUMMARY OF THE INVENTION

It is an object of the present invention to provide a thin film magnetic head having an integrated optical source containing a write pole, the write pole including an upper pole layer, upper pole tip, and upper pole lip; a near field optical source containing a conductive metal film, a C aperture fashioned in the conductive metal film, the C aperture including a rectangular aperture having a ridge extending into the rectangular aperture from a first portion of the conductive metal film, a second portion of the conductive metal film containing the upper pole lip, the upper pole lip making up at least a portion of a boundary of the rectangular aperture opposite the ridge; and, an optical waveguide for illumination of the near field optical source.

It is another object of the present invention to provide a thin film magnetic head having an integrated optical source containing a write pole, the write pole containing an upper pole layer, upper pole tip, upper pole lip, and a magnetic step layer, the magnetic step layer contacting the upper pole tip and the upper pole lip; a near field optical source containing a conductive metal film, a C aperture fashioned in the conductive metal film, the C aperture including a rectangular aperture having a ridge extending into the rectangular aperture from a first portion of the conductive metal film, a second portion of the conductive metal film containing the upper pole lip, the upper pole lip making up at least a portion of a boundary of the rectangular aperture opposite the ridge; and, an optical waveguide for illumination of the near field optical source.

BRIEF DESCRIPTION OF THE DRAWINGS

The present invention will be better understood when consideration is given to the following detailed description thereof. Such description makes reference to the annexed drawings, wherein:

FIG. 1a is partial, cross section view of a thin film perpendicular write head design incorporating an integrated C aperture near field optical source, in accordance with an embodiment of the present invention;

FIG. 1b is a partial cross section expanded view of detail 101 in FIG. 1a, in accordance with an embodiment of the present invention;

DETAILED DESCRIPTION OF THE PREFERRED EMBODIMENTS

Figure 6:
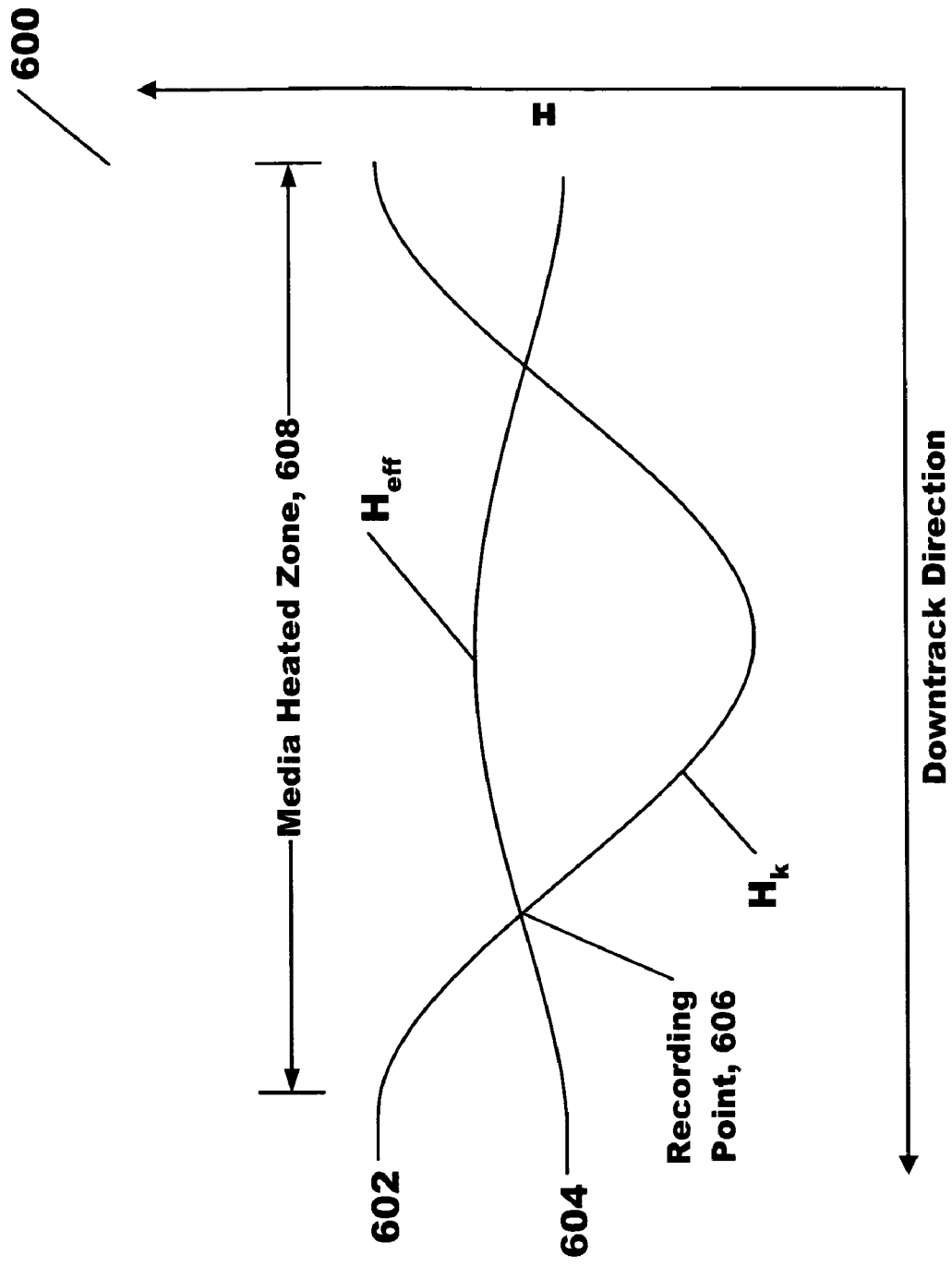
FIG. 6 (Prior Art) is a chart of field strength H as a function of position on the media for conventional thermally assisted recording; and, FIG. 7 is a chart of field strength H as a function of position on the media for dual gradient thermally assisted recording, in accordance with an embodiment of the present invention.
Figure 7:
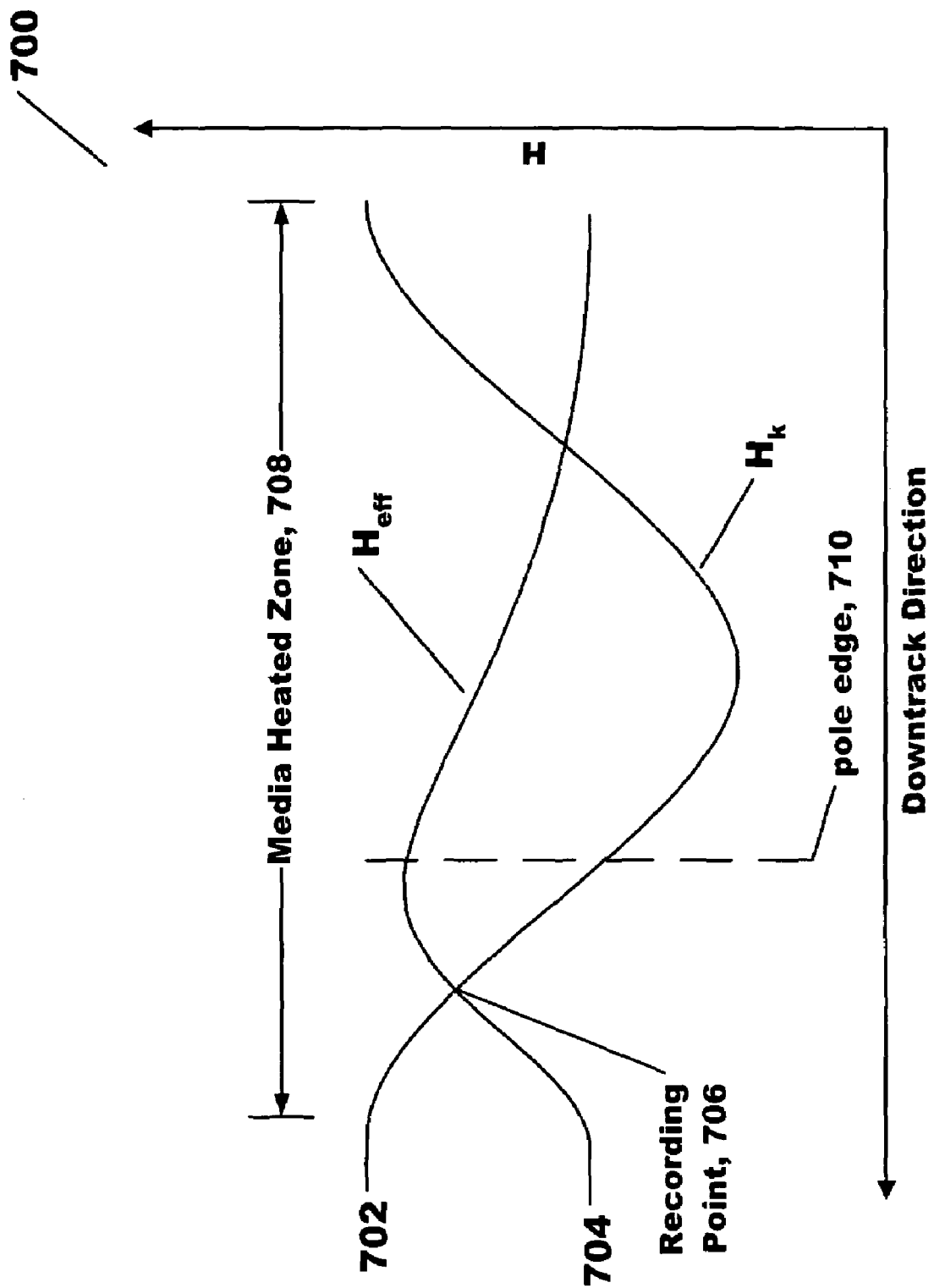

In conventional thermally assisted recording systems, as shown in FIG. 6 (Prior Art), a broadly shaped magnetic field is superimposed upon a sub-100 nm-sized heated zone produced by optical means. The limited size of the heat zone prevents cross track writing of data, but leaves some uncertainty in the down-track location of the data being written on the magnetic media. This is due in part to the finite thermal gradient which results from the shape of the optical absorption profile in the disk and conduction of heat in the disk both laterally and vertically. The larger the magnitude of the thermal gradient, the more precisely the location of the "fixed" data is determined, as shown in FIG. 6. As storage densities continue to increase, and data cells become smaller, any "jitter" in their location will need to be reduced. It is an object of the present invention to provide embodiments for improvement of data recording through implementation of dual gradient thermally assisted recording. The broadly shaped magnetic field, as represented, for example as curve 604 in FIG. 6, is replaced with a magnetic field having a sharper gradient at the recording point, therefore more precisely locating the point at which the data cell becomes "fixed" on the media. This concept is illustrated in FIG. 7. FIG. 7 is a chart 700 of field strength H as a function of position on the media for dual gradient thermally assisted recording, in accordance with an embodiment of the present invention. Curve 702 represents the coercivity $H_k$ of the media within the heated zone 708. Curve 704 represents the imposed magnetic field $H_{eff}$ produced by the write pole. The pole is designed to produce a sharply falling field gradient near the location of the recording point 706, where curves 702 and 704 cross in the down track direction. The added magnetic field gradient reduces the impact of thermal and magnetic variables on the location of the recording point, thereby improving the accuracy of data cell location.

However, obtaining such a magnetic field gradient has not been achieved in devices of the prior art because it requires very close positioning between the heat source and the write pole tip. Generally, this has been difficult to achieve because building a pole tip in close proximity to an aperture near field light source reduces the light efficiency of the aperture, due to the size and shape of the magnetic structures, and absorption of optical power by these structures. The present invention has overcome these difficulties by integrating portions of the magnetic write pole tip into the structure of a C aperture near field light source in such a manner as to not reduce the efficiency of the C aperture significantly.

FIG. 1a is partial, cross section view 100 of a thin film perpendicular write head design incorporating an integrated C aperture near field optical source, in accordance with an embodiment of the present invention. In order to simplify and clarify the structures presented, spacing layers, insulating layers, and write coil layers have been omitted. The write head comprises lower return pole layer 102, back-gap layer(s) 104, upper return pole layer 106, upper pole tip layer 108. Lower return pole layer 102 may also have a lower pole tip (not shown) at the ABS. Layer 110 is an optical waveguide core, surrounded by cladding layers 112. Layers 110 and 112 extend through at least a portion of back-gap layers 104. Detail 101 is shown in an expanded view in FIG. 1b. Coil layers (not shown) and various insulating and spacer layers (not shown) would reside in the cavity bounded by the ABS, back-gap 104, lower return pole 102, and upper bounding layers 106, 108, and 112 as would be recognized by those of skill in the art. Layers 102, 104, 106, and 108 are comprised of a suitable magnetic alloy or material, containing Co, Ni, and Fe. Layer 110 is comprised of a suitable light transmitting material, preferably tantalum pentoxide and/or titanium dioxide. As shown, the core layer 110 has approximately uniform cross section along its length. As well known in the art, the optical waveguide can have a number of other possible designs including a planar solid immersion mirror or planar solid immersion lens which have a non-uniform core cross section along the waveguide's length.

FIG. 1b is a partial cross section expanded view 101 of detail 101 in FIG. 1a, in accordance with an embodiment of the present invention. Pole lip 116 is magnetically coupled to upper pole tip layer 108, and to optional magnetic step layer 114. C aperture 118 (also known as a ridge aperture), surrounding metal layer 120, and pole lip 116 comprise the near field aperture optical source, which is supplied light energy via optical waveguide core 110. Pole lip 116 and optional magnetic step layer 114 are comprised of a suitable magnetic alloy, containing Co, Fe, and Ni. Metal layer 120 is made of Cu, Au, or Cu/Au alloys. Cladding layer 112 thickness is nominally about 200 nm, but may be thicker or thinner depending on the dimensions of other layers in the structure. Optional magnetic step layer 114 has a nominal thickness (the dimension between layers 108 and 110) of about 150 nm, and a nominal depth (as measured from layer 116 to layer 112) of approximately 180 nm. Pole lip 116 has a nominal depth (as measured from the ABS) approximately equal to that of layer 120, with the value being determined by the performance and properties of the near field optical source (see examples below). The thickness of the pole lip 116 can vary from about 150 nm (with the optional magnetic step layer 114) to about 1 micron, preferably between 250 to 350 nm. The thickness of optical waveguide core layer 110 is nominally between 200 and 400 nm, sufficient to cover the width 408 of C aperture 118 (see FIG. 5 below).

Figure 2:
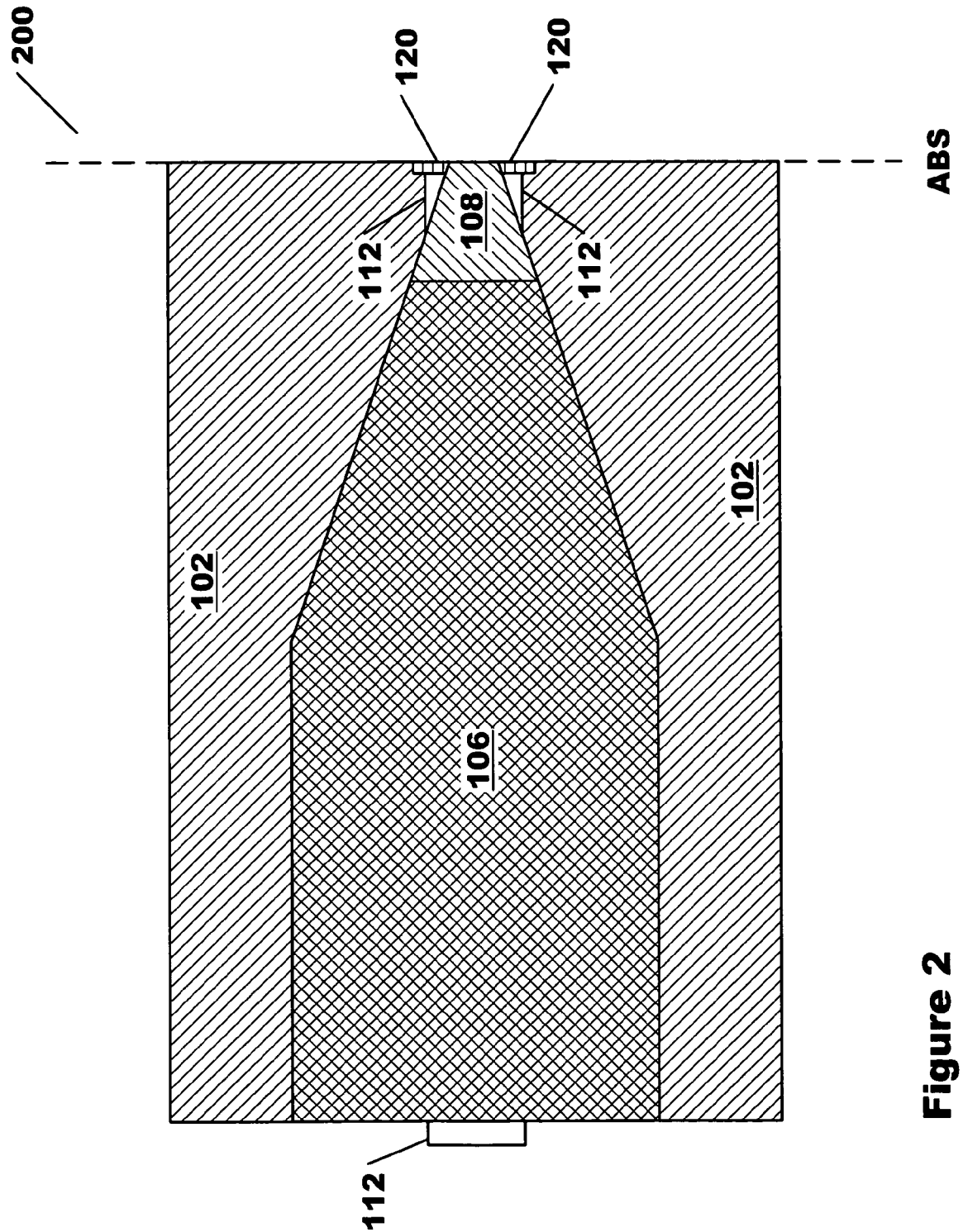
FIG. 2 is a partial plan view of the perpendicular write head design of FIG. 1a, in accordance with an embodiment of the present invention.

FIG. 2 is a partial plan view 200 of the perpendicular write head design of FIG. 1a, in accordance with an embodiment of the present invention. Coil and spacer layers have been omitted for clarity, as for FIG. 1a. This view is a top down view of FIG. 1a. Upper return pole layer 106 and upper pole tip layer 108 are tapered to reduce their width proximate to the ABS.

Figure 3:
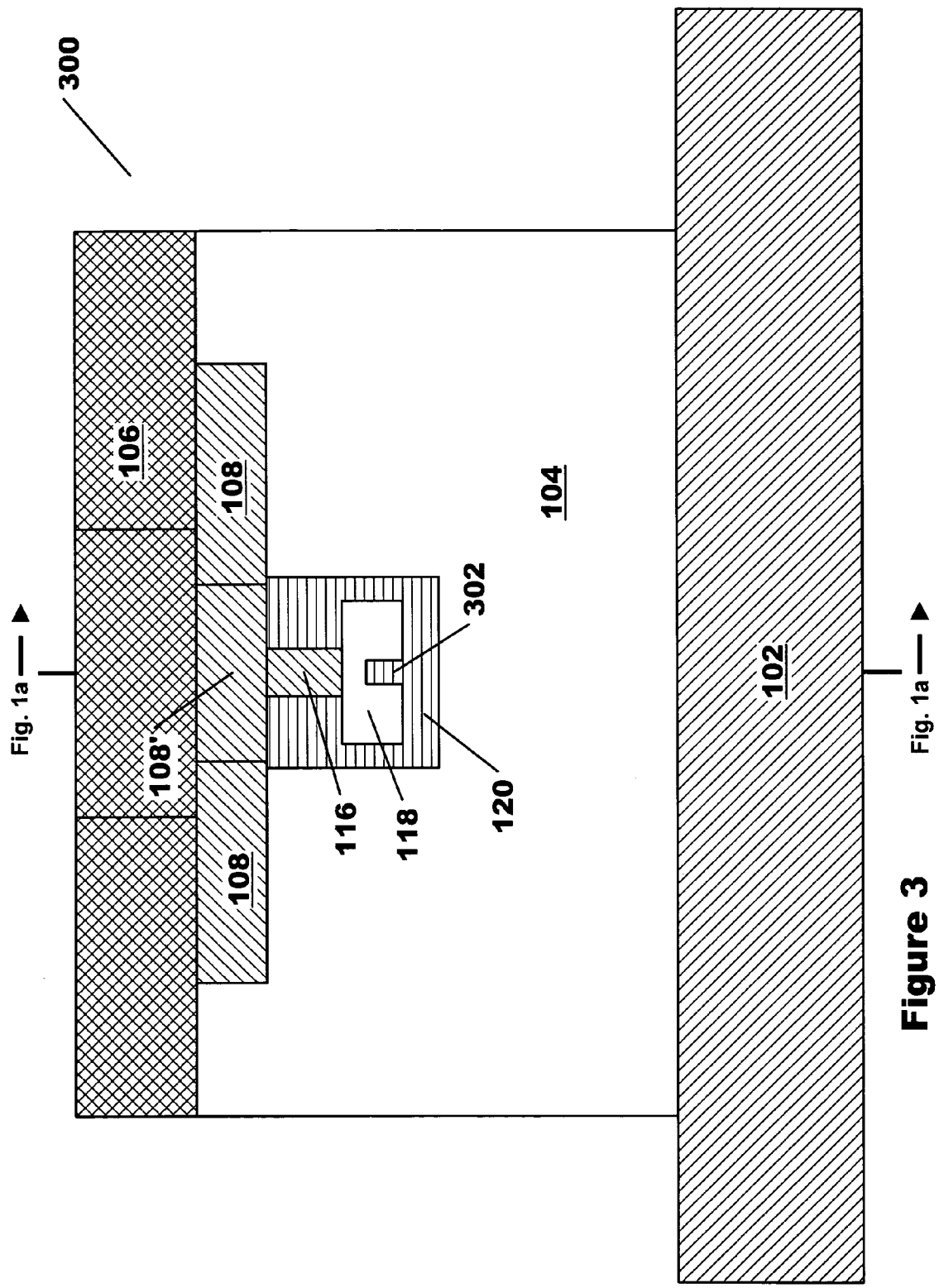
FIG. 3 is a partial air bearing surface view of the perpendicular write head design of FIG. 1a, in accordance with an embodiment of the present invention.

FIG. 3 is a partial air bearing surface view 300 of the perpendicular write head design of FIG. 1a, in accordance with an embodiment of the present invention. Region 108' represents the area of upper pole tip 108 terminating at the ABS. The structure of the near field optical source comprising surrounding metal layer 120, pole lip 116, C aperture 118, and ridge 302 are clearly visible in this view from the ABS. Typically, a C aperture near field optical source consists of rectangular shaped aperture placed in an electrically conductive metal film. Light of the appropriate frequency is directed onto the aperture and the surrounding metal film. In the present invention, light is directed to the C aperture via optical waveguide core 110. Extending into the center portion of the aperture is an electrically conductive ridge 302, generally an extension of the surrounding metal film. Incident radiation, polarized in the direction parallel to the ridge produces a near-field light source which appears close to or at the end of the ridge, in the gap between the end of the ridge and the opposing boundary of the aperture. In the present invention, pole lip 116 is located at this opposing boundary, placing the near field light source in close proximity to the pole lip 116.

Note that pole lip 116 makes up an integral component to the metallic region surrounding the C aperture. In near field light sources of conventional construction, the entire metallic region surrounding the C aperture is comprised of highly conductive metals such as Cu, Ag, or Au. Prior art modeling studies of the conventional C aperture indicated that a highly conductive metal was required to optimize light output of the near field source, and it has been assumed that the entire metal region surrounding C aperture needed to be comprised of a highly conductive material. This generally required that any pole material be placed outside the conductive region surrounding the aperture, limiting the proximity of optical heat source to the pole tip, precluding the use of dual gradient recording. Modeling studies performed in the development of the present invention have uncovered the unexpected development that a pole lip layer 116 of approximately the same thickness as conductive layer 120 (see also FIG. 1b), can be substituted for a portion of the highly conductive layer 120 surrounding the C aperture 118, with minimal impact on the optical efficiency, provided that the pole lip 116 borders aperture 118, and is located across from the end of ridge 302. This locates the effective pole tip of the write head at very close proximity to the thermal region generated by a near field light source, which is located between the end of ridge 302 and the edge of pole lip 116. Returning to FIG. 7, the dashed vertical line 710 denotes the location of the pole edge, which would be the boundary of the pole lip 116 with C aperture 118. The effective magnetic field 704 produced by pole lip 116 enables dual gradient recording at the recording point 706. Returning to FIG. 3, aperture 118 is filled with an optically transparent material such as $SiO_2$ or $Al_2O_3$, as is well known to those skilled in the art.

As an option, one might consider substituting ridge 302 with magnetic Co, Ni, Fe pole material (not shown), effectively relocating the pole tip to the position of ridge 302. However, modeling studies have indicated that the optical efficiency of this configuration is severely degraded when compared to highly conductive ridge materials such as Cu or Au, reducing the heat generated significantly. Furthermore, limiting the pole width to that of ridge 302 may compromise magnetic field properties as well.

Figure 4:
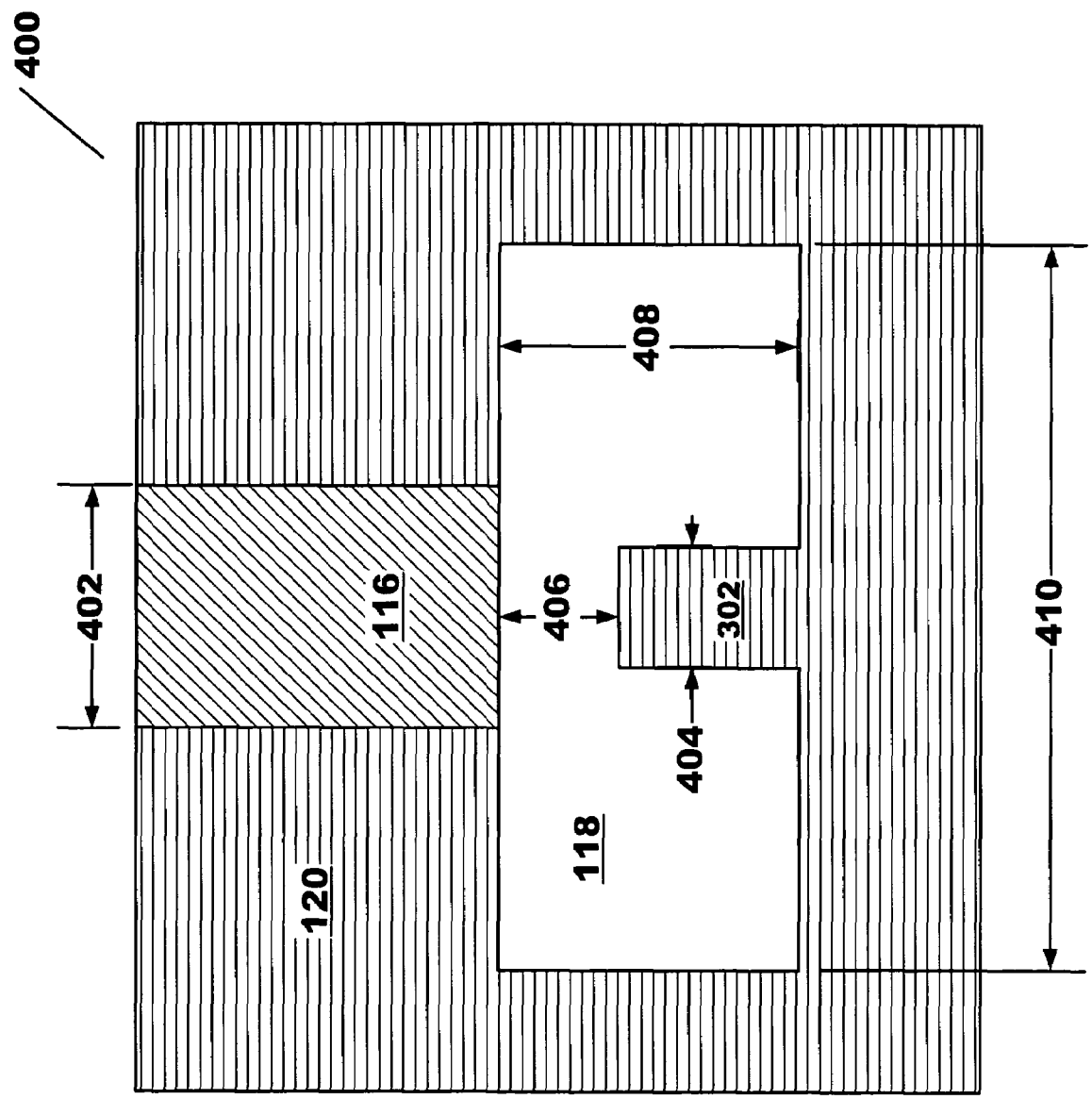
FIG. 4 is a partial air bearing surface expanded view of an integrated C aperture 118 with narrow write pole lip 116, in accordance with an embodiment of the present invention.

FIG. 4 is a partial air bearing surface expanded view of an integrated C aperture 118 with narrow write pole lip 116, in accordance with an embodiment of the present invention. In this embodiment, the width 402 of pole lip 116 is less than the length 410 of aperture 118. The width of aperture 118 is denoted dimension 408. Ridge 302 has a width 404 and a length (extending into aperture 118) of aperture width 408 minus gap length 406. The width 402 of pole lip 116 can vary from the width 404 of ridge 302 at a minimum to the width of the upper pole tip 108 at the ABS (region 108') at a maximum. Typically, the width of upper pole tip 108 (at the ABS) is greater than the length 410 of aperture 118. Since FIG. 4 is a view looking in from the ABS, the dimensions of optical waveguide core layer 110 are not visible. However, it should be noted that the foot print of optical waveguide core layer 110 terminated behind aperture 118 preferably covers at least the width 408 and length 410 of aperture 118.

Figure 5:
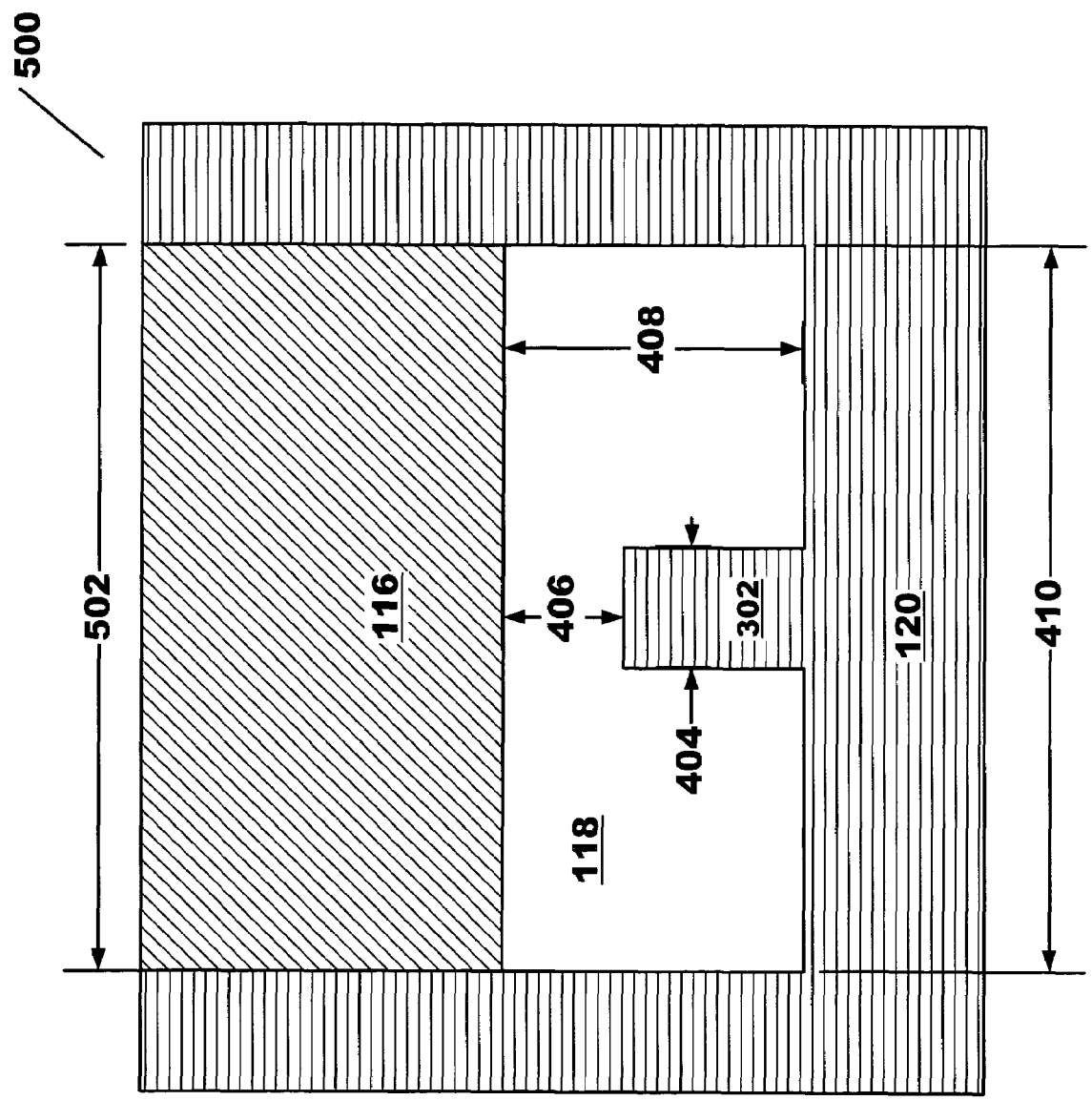
FIG. 5 is a partial air bearing surface expanded view of an integrated C aperture 118 with broad write pole lip 116, in accordance with an embodiment of the present invention.

FIG. 5 is a partial air bearing surface expanded view 500 of an integrated C aperture 118 with broad write pole lip 116, in accordance with an embodiment of the present invention. In this case, the width 502 of pole lip 116 has been extended to approximately equal the length 410 of aperture 118.

EXAMPLES

The following serve to provide representative embodiments of the present invention, but in no manner are meant to limit the scope, range, and function of the invention. In these examples, the vacuum wavelength of the radiation is 780 nm, the disk (media) is modeled as a 20 nm thick layer of cobalt, and the gap between the aperture and disk is 8 nm.

Example 1a (1) Aperture dimensions: Width 408=58 nm; Length 410=280 nm;
Ridge width 404=16 nm; Gap 406=28 nm
(2) Pole lip 116 width 402: ~20 nm
(3) Near field heating efficiency >90%, compared to aperture without pole (100%)

Example 2a (1) Aperture dimensions: Width 408=58 nm; Length 410=280 nm;
Ridge width 404=16 nm; Gap 406=28 nm
(2) Pole lip 116 width 402: ~100 nm
(3) Near field heating efficiency >85%, compared to aperture without pole (100%)

Example 3a (1) Aperture dimensions: Width 408=58 nm; Length 410=280 nm;
Ridge width 404=16 nm; Gap 406=28 nm
(2) Pole lip 116 width 402: ~200 nm
(3) Near field heating efficiency >80%, compared to aperture without pole (100%)

Example 4a (1) Aperture dimensions: Width 408=58 nm; Length 410=280 nm;
Ridge width 404=16 nm; Gap 406=28 nm
(2) Pole lip 116 width 402: ~280 nm
(3) Near field heating efficiency >75%, compared to aperture without pole (100%)

Example 1b (1) Aperture dimensions: Width 408=58 nm; Length 410=280 mm;
Ridge width 404=16 nm; Gap 406=20 nm
(2) Pole lip 116 width 402: ~20 nm
(3) Near field heating efficiency ~75%, compared to aperture without pole (100%)

Example 2b (1) Aperture dimensions: Width 408=58 nm; Length 410=280 nm;
Ridge width 404=16 nm; Gap 406=20 nm
(2) Pole lip 116 width 402: ~100 nm
(3) Near field heating efficiency ~70%, compared to aperture without pole (100%)

Example 3b (1) Aperture dimensions: Width 408=58 nm; Length 410=280 nm;
Ridge width 404=16 nm; Gap 406=20 nm
(2) Pole lip 116 width 402: ~200 nm
(3) Near field heating efficiency ~65%, compared to aperture without pole (100%)

Example 4b (1) Aperture dimensions: Width 408=58 nm; Length 410=280 nm;
Ridge width 404=16 nm; Gap 406=20 nm
(2) Pole lip 116 width 402: ~280 nm
(3) Near field heating efficiency ~61%, compared to aperture without pole (100%)

In the foregoing examples 1a-4a, the gap width 406 was fixed at 28 nm. In examples 1b-4b, the gap width 406 was fixed at 20 nm. The optical source heating efficiency is reduced by about 15% when going from a 28 nm gap to 20 nm. The foregoing data also show a reduction in optical efficiency as the width 402 of the pole lip is increased, and this trend is evident for either gap dimension. Both of these trends are expected when a higher loss material such as a Co, Ni, Fe alloy is substituted for gold or copper in the metal film surrounding the C aperture. However, the reduced optical efficiency, particularly for the 28 nm gap, is within acceptable limits for a functioning TAR system.

Although the foregoing embodiments disclose thin film perpendicular write heads, it will be recognized by those of ordinary skill in the art, that such designs are equally applicable to thin film longitudinal write heads as well with minor modification.

The present invention is not limited by the previous embodiments heretofore described. Rather, the scope of the present invention is to be defined by these descriptions taken together with the attached claims and their equivalents.

What is claimed is:

1. A thin film magnetic head having an integrated optical source comprising:
    a write pole, said write pole comprising an upper pole layer, upper pole tip, and upper pole lip;
    a near field optical source comprising a conductive metal film, a C aperture fashioned in said conductive metal film, said C aperture comprising a rectangular aperture having a ridge extending into said rectangular aperture from a first portion of said conductive metal film, a second portion of said conductive metal film comprising said upper pole lip, said upper pole lip making up at least a portion of a boundary of said rectangular aperture opposite said ridge; and,
    an optical waveguide for illumination of said near field optical source.

2. The apparatus as recited in claim 1, wherein said thin film magnetic head comprises a backgap magnetically coupled to said write pole, said optical waveguide extending through at least a portion of said backgap.

3. The apparatus as recited in claim 1, wherein said optical waveguide comprises a light conducting core layer enclosed in cladding layers.

4. The apparatus as recited in claim 3, wherein said near field optical source has a first surface approximately co-planar with an air bearing surface, said near field optical source having a second surface approximately parallel with said first surface, said second surface opposing said first surface, said light conducting core layer making contact with at least a portion of said second surface.

5. The apparatus as recited in claim 3, wherein said light conducting core layer comprises tantalum pentoxide.

6. The apparatus as recited in claim 3, wherein said light conducting core comprises oxides of titanium.

7. The apparatus as recited in claim 1, wherein said write pole comprises a magnetic step layer, said magnetic step layer contacting said upper pole tip and said upper pole lip.

8. The apparatus as recited in claim 1, wherein said first portion of said conductive metal film comprises copper.

9. The apparatus as recited in claim 1, wherein said first portion of said conductive film comprises gold.

10. The apparatus as recited in claim 1, wherein said second portion of said conductive film comprises a magnetic alloy.

11. The apparatus as recited in claim 10, wherein said magnetic alloy comprises Co, Ni, and Fe.

12. The apparatus as recited in claim 1, wherein said C aperture is filled with an optically transparent material.

13. The apparatus as recited in claim 1, wherein said upper pole lip has a first width, said ridge of said C aperture having a second width, said first width being greater than or equal to said second width.

14. The apparatus as recited in claim 13, wherein said upper pole tip has a third width, as measured at an air bearing surface, said first width being less than or equal to said third width.

15. The apparatus as recited in claim 14, wherein said second width is about 16 nanometers, said first width varying between about 20 nanometers and 280 nanometers.

16. The apparatus as recited in claim 15, wherein a near field heating efficiency varies between about 75% and 90%, when compared to a C aperture having said second portion of said conductive metal film made from gold.

17. A thin film magnetic head having an integrated optical source comprising:
    a write pole, said write pole comprising an upper pole layer, upper pole tip, upper pole lip, and a magnetic step layer, said magnetic step layer contacting said upper pole tip and said upper pole lip;
    a near field optical source comprising a conductive metal film, a C aperture fashioned in said conductive metal film, said C aperture comprising a rectangular aperture having a ridge extending into said rectangular aperture from a first portion of said conductive metal film, a second portion of said conductive metal film comprising said upper pole lip, said upper pole lip making up at least a portion of a boundary of said rectangular aperture opposite said ridge; and,
    an optical waveguide for illumination of said near field optical source.

18. The apparatus as recited in claim 17, wherein said first portion of said conductive metal film comprises copper.

19. The apparatus as recited in claim 17, wherein said first portion of said conductive film comprises gold.

20. The apparatus as recited in claim 17, wherein said second portion of said conductive film comprises a magnetic alloy.

* * * * *